July 20, 1965 R. G. PAPELIAN 3,196,279

PHOTOSENSITIVE DIGITAL SHAFT ENCORDER

Filed June 12, 1962 2 Sheets-Sheet 1

INVENTOR.
ROGER G. PAPELIAN
BY [signature]
[signature]
ATTORNEYS

INVENTOR.
ROGER G. PAPELIAN
BY Alfred H. Rosen
Robert J. Schiller
ATTORNEYS 3,196,279

PHOTOSENSITIVE DIGITAL SHAFT ENCODER

Roger G. Papelian, Milford, Mass., assignor to Computer Control Company, Inc., Framingham, Mass., a corporation of Delaware Filed June 12, 1962, Ser. No. 201,959
11 Claims. (Cl. 250—237)

This invention relates to encoding devices and more particularly to improvements in digital shaft angle encoders.

Digital shaft angle encoders have been widely employed to provide accurate indications of relative angular positions between elements in terms of digital signals adapted, for instance, for direct input to digital data processing equipment. Most such encoders employ a disk mounted on and rotatable with a shaft whose angular position is to be measured. The disk is characterized in having a plurality of annular, concentric information channels or tracks of different radii, the tracks being digitally coded in a repetitive symmetrical code, for instance, in binary code. Operation of optical encoders of this type are based upon coded modulation of radiation, as by transmission of light through permeable or transparent areas in a disk where coding is in the form of light-opaque and permeable areas. Typically, an optical encoder of the prior art employs a radiation source for illuminating an area lying along a predetermined radius of a coded disk. Light is transmitted through the transparent portions of the disk lying along that radius, and passes through a radially disposed optical slit to finally impinge upon photoelectric means responsive to the presence or absence of illumination. The output of the photoelectric means is then amplified by appropriate means to provide an electrical digital code functionally related to angular shaft position.

The number of concentric tracks on the disk is determined by the desired degree of resolution of the encoder. For example, if a full rotation of the shaft is divided into only 8 quanta expressed in binary notation as bits, then only 3 tracks are necessary ($2^3=8$), and the degree of resolution is $2^3$. Each binary number would then represent a discrete shaft position within 45°. Similarly, and more practically, if it is desired to divide the entire 360° of shaft rotation into 8,192 equal parts, then 13 tracks would be necessary ($2^{13}=8,192$). In this latter instance, each part would represent an angular measurement of approximately 2.6 minutes of arc. Thirteen track encoder disks of 3½″ diameter are common. Instruments claiming $2^{18}$ resolution in a 10″ diameter have also been made.

Conventional practice has been to provide disks in which the coding takes the form of alternating opaque and transparent areas or segments in each track. The relation of the groups of segments of each track with respect to the next adjacent tracks, in terms of number and position, is determined by the particular code employed. For instance, standard practice is to provide the track of greatest radius (i.e. the outermost track) with the code grouping representing the group of least significant digits (LSD), each track of next successive smaller radius having the group of next more significant digits, until the track of least or shortest radius contains the group of most significant digits (MSD). Thus, when coded in binary notation, the innermost track contains the digits of the largest power ($n$) of 2, the next outer track the digits of the $n-1$ power, and so on until the outermost track then contains the digits of the least power of 2, all as well known in the art. Conventionally it is preferred to employ Gray code (sometimes known as reflected or cyclic binary code) to reduce possible ambiguous indication of shaft position, inasmuch as the numbers in the Gray code only change one bit at a time.

The optical slit employed with standard optical encoders has a substantially invariant or fixed width which is usually less than the width of an LSD segment in the outermost track. Because the slit width is typically quite fine, practical manufacturing requirements have limited the form of the slit to the fixed width type. However, certain errors are inherent in this type of structure. For instance, referring particularly to FIG. 1 there is shown a portion of the prior art encoder structure heretofore described including fixed width slit 20 and the edges 22 and 24 of two coded segments on respectively different tracks of a part of disk 26, the dimensions being exaggerated for the sake of clarity and the edges for sake of simplicity both being shown as abutting the slit. It can be assumed, for explanatory purposes, that slit 20 is wholly exposed by transparent segments of the different tracks adjacent the position of both edges 22 and 24, and that light is traversing the slit after passage through the transparent segment superimposed thereon. Both edges 22 and 24 are, in accordance with standard practice, radially directed from the center of rotation 28 of the disk. Edge 22 is disposed on a track having an arbitrary radius ($R_2$) from the center of rotation and edge 24 is disposed on another track having an arbitrary radius $R_1$ from the center of rotation where $R_2>R_1$. Hence, the encoder is fully "on" with respect to the coded segments respectively having edges 22 and 24. In order for the encoder to go from the "on" to the "off" condition with respect to the coded segment having edge 22, the latter must be moved through an angle 30 to bring the opaque area adjacent edge 22 completely across slit 26 and cut off the light. The relation of the change in light level (i.e. light traversing the slit at the intersection of the latter with the track having edge 22) with respect to the angular movement of edge 22 is shown graphically in FIG. 2 as curve 32.

However, referring again to FIG. 1, it will be seen that if edge 24 is moved through the sample angle 30, the opaque area adjacent edge 24 cannot completely cover the width of slit 20. Therefore, the level of illumination traversing the slit at the intersection of the latter with the track having edge 24 cannot go from full "on" to full "off." Instead a large angular movement is required to effect the transition from "on" to "off." The relation of the change in light level with angle for edge 24 is shown graphically at 34 in FIG. 2. Comparison of curves 32 and 34 in the latter figure indicates that, for a fixed width slit, the transition from full "on" to full "off," for a coded segment, and vice versa, has a median slope which is a function of the radius of the track in which the particular coded segment is located. As the radius increases, the median slope becomes greater in absolute value. Hence, a transition differential exists between all of the tracks of the disk. Due to this large transition differential between tracks, the control of all component tolerances which affect angular accuracy of the ultimate read-out signal to within ±1 bit accuracy, particularly as is required with the unambiguous Gray code, has been onerous and difficult.

Typically, optical encoders of the type heretofore described also employ for amplifying the output of each photocell detecting the light traversing each track, a "thresholding" amplifier which operates only when its input is above a preset electrical signal level from its associated photodetector. At or below that level, signals will not appear in the amplifier output. This serves to reduce the possibility of ambiguity in output signals. Obviously, such amplifier inputs must be set well above the noise of the circuit. Usually all such amplifiers in a given encoder are set at the same approximate threshold value.

In place of fixed width slit 20, an optical encoder could employ a V-shaped slit having radially disposed sides approaching zero width near the center of rotation of the disk, and having a maximum width of less than the circumferential extent of a bit or half of an LSD segment. This would, in theory, effect fairly uniform light-signal vs. shaft-angle slopes regardless of track radius. However, the level of the light passed through the slit at full "on," would diminish very nearly proportionally with the decrease in slit width so that, at the intersection of the slit with the innermost track (for disks of 3 to 4 inch diameter, for instance), the light intensity would be below the threshold level of the amplifiers and the most significant digits could not be read out. Thus, while a V-shaped slit would seemingly solve the problem of transition differentials between tracks by providing a substantially constant transition slope regardless of track radius, the light intensity passed by the slit would decrease for some application to unusably low levels as a function of decreasing track radius.

A principal object of the present invention is therefore to provide an optical shaft position encoder in which the transition slope and "on" light level derived from each track is substantially uniform thereby endowing optical encoding disk structures with substantially increased accuracy. Other objects of the present invention are to provide an improved optical shaft position encoder of the type described in which the uniform transition slope and light level are at least in part derived by averaging techniques overcoming shifts in the center of disk rotation and slit narrowness effects; to provide such an optical shaft position encoder in which increased resolution of shaft angle is obtained by including a disk having a plurality of annular concentric tracks of different radii wherein the outermost track is coded with the group of most significant segments, each successive track of lesser radius having a coded group of lesser significant segments, the innermost track having the LSD code group; to provide an encoder of the type described in which the optical slit is formed either as a simulated or true V-slit; to provide an encoder of the type described including means for collimating the illumination directed towards a predetermined radius of the disk; and to provide an encoder of the type described which is capable of very high improved accuracy and resolution yet is simple to manufacture and assemble, having reasonable manufacturing tolerances in the components yet allowing interchangeability of all components and longer life to lamps.

Other elements and their novel coaction as well as further objects and advantages of the present invention will in part appear obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and operation of the invention, reference should be had to the following detailed description taken in connection with the accompanying drawings in which.

Figure 1:
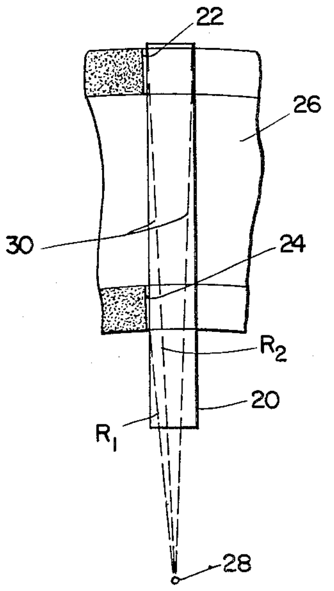
F I G. 1 (PRIOR ART)
FIG. 1 is a fragmentary diagrammatic representation of the fixed width slit of the prior art and its relation to coded segments on selected tracks on an encoder disk.
Figure 2:
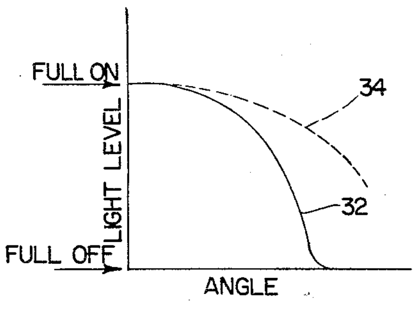
F I G. 2 (PRIOR ART)
FIG. 2 is a graphical representation of illumination vs. angle relationships of coded segments of different tracks shown in FIG. 1.
Figure 3:
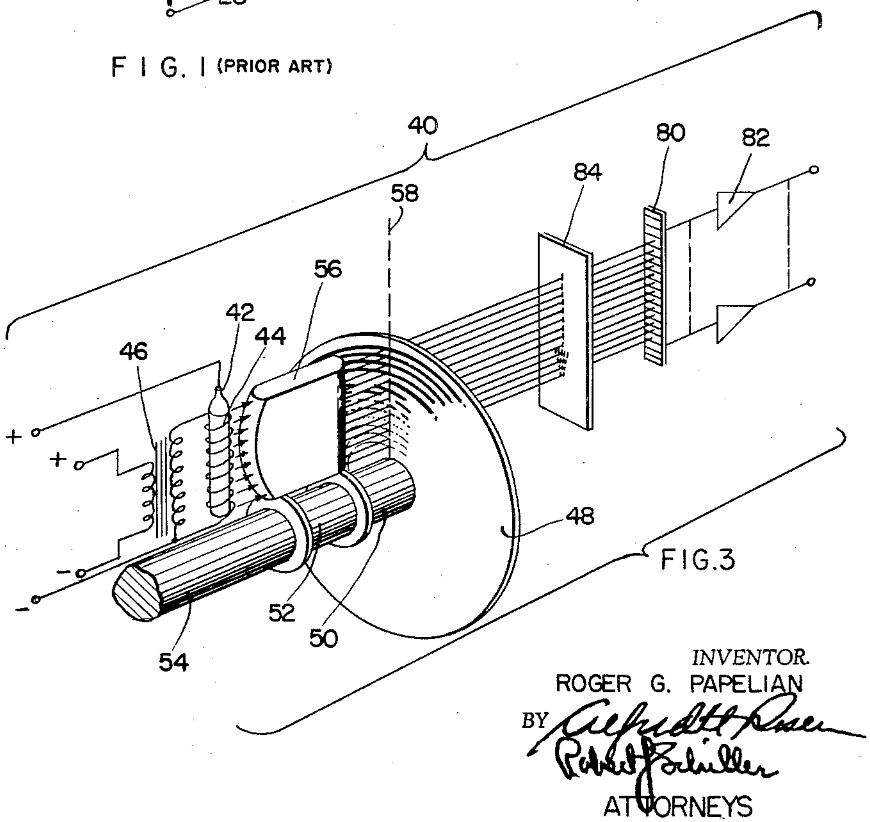
Figure 4:
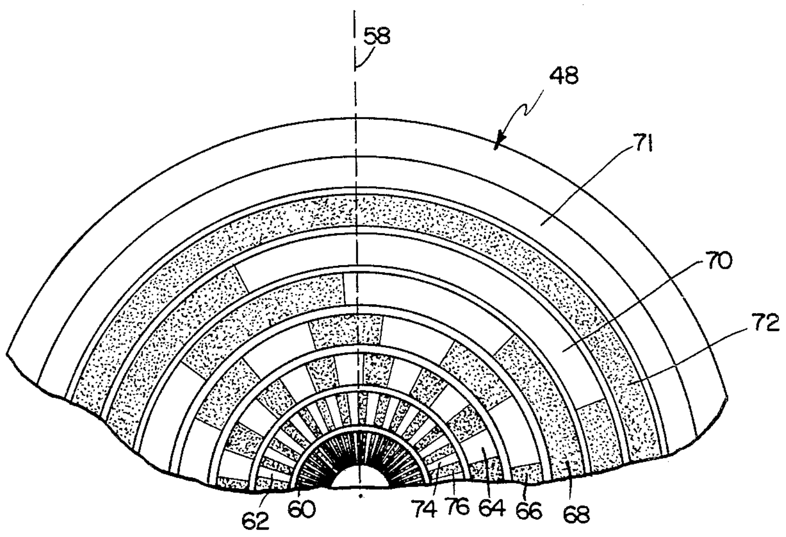
Figure 5:
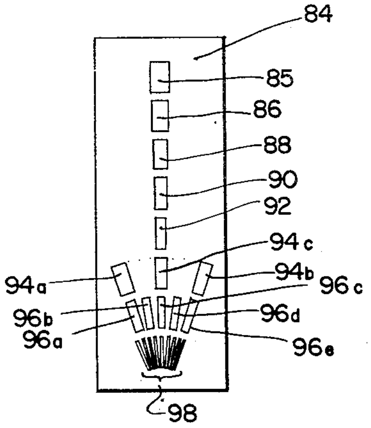
Figure 6:
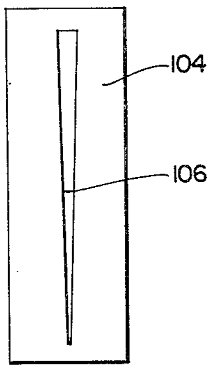

FIG .3 is a schematic representation of one embodiment of the present invention;

FIG. 4 is a fragmentary plan view of an exemplary coded disk of the embodiment of FIG. 3 showing coding details omitted in the latter figure, the angular relationships and dimension being exaggerated for clarity in description;

FIG. 5 is a detailed plan view of an exemplary optical slit structure forming a part of the embodiment of FIG. 3, angular relationships and dimensions also being exaggerated; and FIG. 6 is a plan view of another exemplary optical slit structure with exaggerated relationships.

Generally, the present invention contemplates an optical shaft angle encoder having a novel disk which includes a coded configuration differing radically from the prior art in that, for instance, when the disk is coded in Gray code, the LSD code segments of uniform dimensions of the novel disk are spaced about the innermost track, with the more significant digit code segments being distributed in groups in sequence upon successive tracks in order of the increasing magnitude of the track radii. The disk is therefore "inside out," with respect to disks of the prior art. The present invention also employs, in conjunction with the novel disk, a novel optical slit configuration which is termed herein a "simulated V" and will be described in detail hereinafter.

As will be seen, through the incorporation of these two novel elements in place of the standard disk (having LSD segments in the outermost track) and the standard fixed width slit, substantially increased accuracy and resolution on optical encoding can be realized over encoders having prior art disks of similar diameter.

Referring now specifically to FIG. 3 there will be seen an encoder apparatus, indicated generally at 40, embodying the principles of the present invention. Apparatus 40 includes an illumination source such as flash lamp 42. The latter, for instance, may be a standard xenon-filled tube wrapped in coil 44, the coil being connected to a readout "trigger" and the tube electrodes across a potential of, for example, 300 volts. Flash lamp 42 can be triggered to provide a light pulse by insertion of a trigger command of a few volts to the primary of transformer 46, the secondary of the transformer being connected across coil 44, all as well known in the art. Alternatively, other illumination sources, either pulsating to provide flashes of predetermined duration at fixed or varying intervals, or continuous in nature may be provided in accordance with the desired read-out format.

Apparatus 40 also includes coded substantially planar disk 48 mounted on shaft 50 for rotation with the latter and in the plane of the disk, the configuration of the disk being described hereinafter. Shaft 50 includes means such as bearings 52 for precisely mounting shaft 50 coaxially and concentrically with shaft 54, the angular displacement of the latter being the parameter which it is desired to measure and convert into digital signals.

Apparatus 40 also includes means, such as optical element 36 disposed between lamp 42 and coded disk 48 for colliminating the light from the flash lamp and directing the collimated light upon a predetermined radially disposed area of one side of disk 48. In the form shown, optical element 56 is an anamorphic lens formed of a transparent solid material such as glass, plastic, or the like, having surfaces thereof curved in known manner to accept light from a substantially linear (as distinguished from point) source of light and collimate such light to direct it substantially perpendicularly to an elongated planar area lying along a fixed line 58 which is radial with respect to disk 48.

Other optical collimating devices of known structure may also be employed depending upon such factors as the available space, the nature of the illuminating radiation, and the geometry of the illumination source.

Disk 28 is an element having a pair of substantially planar and parallel faces. As shown in detail in FIG. 4, the disk includes a plurality of annular concentric information channels or tracks such as 60, 62, 64, 66, 68, 70, 72, and 71 of substantially the same radial width, but of different radii. Each track bears coded information in the form of a number of alternating radiation permeable and opaque angular segments such as 74 and 76, having radially disposed, substantially straight edges, each track being divided uniformly into such segments which are then of equal circumferential dimension for any given track. Where the radiation employed is visible light, for instance, the disk may be formed of a light transparent glass, the opaque segments being formed as a coating on one disk surface, for example, of metal deposited as by photographic techniques, vacuum deposition through a mask, or the like. In the present invention, outermost track 71 i.e. the track of greatest radius is divided into segments representing the most significant digits of the code, each track of next successive smaller radius being divided into the coded segments representative of each successive group of next lesser significant digits. Thus, track 60 of least or shortest radius is divided into the group of least significant digits in the form of uniform code segments.

As heretofore explained, the disk is preferably coded in Gray code so that in a sequential change from any code number to any next adjacent number, the change requires that only one digit or bit of the number be altered. The disk shown in FIG. 4 is illustrated as being so coded and it will be seen that the innermost or LSD track 60 contains a large number $n$ of coded segments, track 62 next adjacent thereto therefore contains $n/2$ code segments each of which occupies a circumferential dimension substantially twice the angle subtended by a code segment of track 60. Similarly track 64, next outermost to track 62, has coded segments of $n/4$ in number, each of which then occupies an arc subtending 4 times the angular dimension of a code segment of track 60. It wil be observed that in order to provide but a single digital change for any position of disk 48, any edge of any coded segment of a given outer track bisects one code segment of each of the inner tracks. For proper coding the entire outermost or MSD track 71 is divided into only two equal segments, one transparent the other opaque. Next track 72 is also divided into only two equal segments, one of which is transparent, the other of which is opaque, the segment here being displaced 90° from the segments of the MSD track. Track 70, next innermost from track 72, is divided into four equi-angular coded segments, two transparent and two opaque. Track 68 will then be divided likewise into 8 equal segments; track 66 into 16 equal segments; track 64 into 32; track 62 into 64; and track 60 into 128. The ultimate number of segments in the LSD track of any such disk will be therefore $2^{x-1}$, where $x$ is the number of tracks. As means responsive to light transmitted through selected transparent code segments of disk 48 and for translating the intermediate light into electric signals, there is provided a plurality of photoelectric elements 80 of known structure. The latter are in a predetermined array such as a column disposed parallel to line 58 on the other side of the disk from optical element 56. The predetermined array is arranged so that each discrete one of elements 80 thereof is positioned in the path of light which may be transmitted through a corresponding one of the tracks of disk 48. Elements 80 may be either photoresistive or photovoltaic depending upon the desired response. For example, whether lamp 42 is a xenon-filled flash lamp which is to be pulsed and therefore requires about 3 microseconds to reach ⅓ peak intensity or a continuous source, the response time of elements 80 is sometimes quite important and elements 80 are preferably formed of silicon photovoltaic cells. The latter are preferred because of their fast rise-times of approximately 1 microsecond or better. If on the other hand, slow rates of information may be used or lesser information per size is required, slower time-response but greater light-sensitive elements 80 may take the form of photoresistive or photo-conductive devices such as known photodiodes, photo-transistors or the like, having quite small sensitive areas (in the order of $1 \times 10^{-3}$ in.$^2$) for comparatively large sensitivities (for instance, about 1 or 2 amps/lumen).

The invention also includes means, such as "threshholding" amplifiers 82 having their inputs coupled to the outputs of respective ones of elements 80, for amplifying the electrical output of each of the latter so that the electrical signals are adapted for input to any of several known read-out devices. When there is one of the amplifiers 82 for each of elements 80, the output of the encoder is parallel i.e. all of the digital bits representative of a given shaft position being available simultaneously at the amplifier outputs. However, as will be apparent to those skilled in the art, the output of elements 80 can be multiplexed into a single amplifier for serial data recovery. In the event lamp 22 is operated continuously rather than on a pulsating basis, the read-out command may be employed to actuate, for instance, the amplifier's output.

Disposed between the array of elements 80 and code disk 48 is means, such as slitted plate 84, for limiting the light transmitted through each track of the disk to a restricted area on a surface of a corresponding one of elements 80.

Plate 84, shown in detail in FIG. 5, is a substantially planar elongated element formed of material, such as metal or glass with an opaque coating of metal, paint, or the like. A plurality of radiation permeable elongated openings including such slits as 86, 88, 90 and 92 of substantially equal length are disposed lengthwise and uniformly spaced along a line such as the axis of elongation of plate 84 to form a novel optical slit configuration which is termed herein a "simulated-V." Plate 84 is so disposed in apparatus 40 that its plane is substantially parallel with the plane of disk 48, and its axis of elongation is parallel with predetermined line 58. Each of the slits heretofore described disposed in alignment with light transmitted therethrough a corresponding one of the tracks of the disk. For instance slit 85 is aligned with the light transmitted through the intersection of track 71 and line 58. Slit 86 is aligned thusly with track 72, slit 88 with track 70 and so on. Slit 85 which then corresponds to outermost or MSD track 71 is dimensioned in width to provide an acceptable transitional slope which is such that the angular change required by the entire transition between the "off" and "on" states is one bit or less than half the width of an LSD segment on track 60, and the area of slit 85 allows an adequate amount of light therethrough to stimulate the corresponding one of elements 80. Slit 86, corresponding to the next-to-outermost track 72, is dimensioned in width to provide a transitional slope of approximately the same magnitude, hence is slightly narrower than slit 85. Each successive slit in the sequence is similarly proportioned in lesser width. It will be seen that the width of each slit is determined in accordance with the radius of the particular track corresponding thereto. Thus, the level of light of given intensity transmissible by the slits in the sequence will change proportionately step-wise with the slit width. If this configuration were to be continued to include all of the slits extending from slit 85 positioned adjacent MSD track 71 to the slit positioned adjacent LSD track 60 it would in effect duplicate the V-shaped slit; however at some intermediate slit, the light level transmitted therethrough would be below a usable quantity depending on the light intensity of the lamp, the sensitivity of the photocells and other factors, such as the transmissiveness of the permeable segments.

Thus, as occurs with a V-shaped slit at a point toward its narrower end, for some one location adjacent a given intermediate track, say track 64, the single slit configuration preferably is replaced with a first group 94 of slits 94a, 94b, and 94c provided in plate 84. First group 94 is a group transversely disposed to the axis of symmetry of plate 84, such as a multiple slit configuration having one slit along the axis of symmetry of the plate. The other slits 94a and 94b are, with respect to the curvature of corresponding track 64, also radially directed and grouped circumferentially and preferably symmetrically about slit 94*c*, being spaced from slit 94*c* a mean distance equal to the mean circumferential width of a uniform code segment of the corresponding track. Each slit of group 94 is dimensioned in length to approximately the radial width of corresponding track 64, and in width so that the total area of slits of the group is adequate to provide at least the desired minimum light level required to stimulate the corresponding one of elements 80, while maintainling an approximately uniform transition slope for each slit, which slope is not less than the minimum transition slope established by MSD slit 85. The number of slits, for the sake of ease and manufacture, is preferably minimal; hence may either be three as shown in FIG. 5 (in which case one slit lies on the axis of symmetry and the grouping is symmetrical with each other slit lying on either side of the one slit) or may be other numbers such as two (in which case the slits would preferably lie equidistant on either side of the axis of symmetry a proper distance apart).

For each track having a smaller radius than the given intermediate track, as for instance track 64, the means for limiting the light is also in the form of a transversely disposed group of slits. For the next track of smaller radius than the given intermediate track, the corresponding transversely disposed group of slits is directed, grouped and spaced, with respect to the locus of that next track, in much the same manner as group 94. For instance, corresponding to track 62 there is, as shown in FIG. 5, slit group 96 which has a greater plurality of slits than group 94 and comprises for instance 5 slits—96*a*, 96*b*, 96*c*, 96*d* and 96*e*. Corresponding to track 60 is another group 98 of slits disposed next to group 96 and having a greater plurality of slits for instance than group 96. It will be seen that the number of slits in each group therefore increases inversely as the radius of the track corresponding to the group. For instance, the number of slits in each group may increase according to the series 3, 5, 9, 17 $(2n+1)$; 2, 3, 4, 5, 6, $(n+1)$; 3, 5, 7, 9, $(2n+1)$ and many others. While all the single slits (i.e./86, 88, 90 and 92) lie along a single line as has been heretofore described, similarly each of groups 94 96 and 98 are also disposed relative to this line and transversely thereof, preferably but not necessaritly symmetrically. The width of the slits of each group, quite like the width of each of said single slits of the sequence, decreases in accordance with the successively decreasing radius of the corresponding tracks. The total angle subtended by each group is preferably but also not necessarily the same.

In operation, lamp 42 is excited to emit radiation, it being understood that while the usual construction will employ visible light as the radiation, the invention is not necessarily limited thereto. The light provided by lamp 42 illuminates optical element 56 which collimates the light and directs the latter in substantial parallel rays to radius 58 of disk 48. Within the resolution of disk 48, for each discrete angular position of the latter established by the rotation of shaft 54, there will exist a unique coded array of track segments lying along radius 58. This can readily be accomplished by coding the disk in one of many codes such as straight binary or Gray. For the angular relationship of disk 48 shown in FIG. 4 with respect to radius 58 no light can traverse track 72, because an opaque segment intersects radius 58. Hence, no light is transmitted through slit 86 to the corresponding one of elements 80, and no electrical signal in introduced to the corresponding one of amplifiers 82. This can be interpreted as the equivalent of either one of the two binary numbers, but the "no signal" condition will be considered herein to be the equivalent of the binary ZERO. However, light impinging on tracks 70 and 71 is transmitted therethrough because a light-permeable segment is shown at the respective track-radius intersection. The light so transmitted is limited by slits 88 and 85 respectively so as to fall only upon respective ones of elements 80 corresponding to those slits, thereby providing an electrical signal corresponding to binary ONES. It will be seen by examining FIG. 4 that light impinging on the disk along radius 58 and perpendicular to the plane of the disk should provide an electrical output which takes the binary form of 1010111101.

It can be assumed, for the sake of discussion, that light traversing the intersection of radius 58 with the permeable segment of track 64 and falling upon slit 94*c* would be unable, because of the inadequate area of the latter, to stimulate the corresponding one of elements 80 into producing a signal beyond the threshold set for amplifiers 82. Consequently, if only slit 94*c* were in the array on plate 84 the encoder would give a spurious output with respect to the segment at track 64. The inclusion of slits 94*a* and 94*b* solves this problem. Light from optical element 56, while falling substantially along radius 58 is not limited thereto, but has a finite width which is sufficient to encompass all of the coded segments on either or both sides of radius 58 which correspond to the individual slits in the multiple slit groups. Therefore, light from optical element 56 not only traverses the permeable segment on track 64 which intersects radius 58, but also traverses one or more other light-permeable segments on that track. Because of the spacing between the slits in group 94, the light traversing the "non-radial" segments of the track falls on the corresponding other slits of group 94, being passed therethrough. The one of photoelement 80 corresponding to group 94 is dimensioned so that all of the light traversing all of the slits in group 94 falls upon the one element. Thus the light actuating the element is the total energy received from all of the individual slits of the group, and this is adequate to provide an electrical output above the threshold level of the amplifiers. The description of the operation of group 94 may be similarly applied to groups 96 and 98, their corresponding tracks 62 and 60, and their corresponding ones of elements 80. When it is desired to provide a high resolution disk of small diameter (i.e. $2^{15}$ in 3 inches) it is obvious that the widths of the individual slits in the slit group corresponding to the LSD or innermost track, will be extremely fine and approach or be even less than the wavelengths of the light used. Even so, the multiple slit groups as herein described are entirely feasible for achieving useable electrical signals. Transitional slope problems due to diffraction will begin to occur only when the width of the segments in the disk become smaller than the wavelengths of light. Diffraction due to the slit widths is unimportant since the photodetector is influenced only by the quanta of energy received and not the form thereof. The conventional limit for minimum useable signal levels in encoders accurate to $\pm 1$ bit from single slits has been approximately $1\times 10^{-4}$ inches. This must be approximately 20% of the segment width for reasonable slit-to-disk spacing and read-out resolution. Thus the segment width limit for $\pm 1$ bit accuracy has been approximately $5\times 10^{-4}$ inches. Segment widths on disks using multiple slit groups may now be as low or lower than $2\times 10^{-5}$ inches for equivalent accuracy. This requires better precision than the present limit set by photographic techniques. The provision of such fine lines by such methods is determined by the resolution of photographic plates, which is given as approximately $4\times 10^{-5}$ inches. Even at this level, there is a significant increase in resolution (for true $\pm 1$ bit accuracy despite environmental changes such as temperature and variations due to ageing and manufacturing tolerances of components) of a whole order of magnitude due to the substantially uniform transitions from "on" to "off" with adequate signals, and the averaging effects of the multi-simulated V coacting with the inside-out code disks.

When slit widths are provided of such small dimensions, effects due to edge roughness normally become important. In encoders with a slit of relatively large width, for instance $1 \times 10^{-2}$ inches, edge roughness of the order of $1 \times 10^{-5}$ inches, for example, does not significantly alter the total light energy passed through the slit. Such deviations in edge tolerance of very fine slits can amount to a significant change in area and therefore total illumination passed. However, with the use of multiple slit groups of the invention, it will be seen that the individual one of elements 80 receiving light from a slit group will be exposed to a total energy which is equal to the product of the number of slits of the group multiplied by the energy passed per slit. Deviations from this mean energy for any slit become immaterial due to the averaging of all energy from all the slits. Since distortions are most apt to occur in the smallest segments, for disks made by photographic techniques the averaging "ability" of the multiple slit groups is greatest at the greatest point of need. One-half the total information is contained on the LSD track, ¼ on next, ⅛ on next, 1/16 on next, 1/32 on next. Inasmuch as $\frac{1}{2}+\frac{1}{4}+\frac{1}{8}+\frac{1}{16}+\frac{1}{32}=\frac{31}{32}$, 96.87% of all the information on the disk is "averaged" in each revolution. Errors due to minute shifts in the location of the center of rotation of the disk (caused for instance by bearing inaccuracies) are also overcome by the averaging effect of the multiple slit groups.

It will also be seen that the use of multiple slit groups, in conjunction with the individual slits of decreasing width of the main sequence, provides from inner to outer track radii an essentially uniform slope throughout the system with increased signal levels, the latter not materially affecting angular accuracy. Because of the increased light signal levels obtainable throughout the encoder it is also possible to utilize less sensitive detectors as elements 80 than as heretofore been possible.

While the invention has been described in connection with an optical element 56, the latter is not necessary to its operation inasmuch as it is possible to place lamp 42 in a position sufficiently distant from disk 48 that the light from the lamp is approximately collimated. However, the use of a collimating element provides significant advantages. Where the lamp is in close proximity to the disk, serious problems can arise; for instance, detectors usually generate low level signals in the order of millivolts. In optical encoders where several kilovolts are required to trigger the lamp and hundreds of volts are switched, the noise level substantially limits accuracy, reliability, or both. The requires proper radiation shielding, dressing of leads and other precautions in order to gain maximum light intensity from close proximity at tolerable noise levels.

With the use of multiple slit groups which permits the use of heretofore unuseable slit widths, the spacing between plate 84 and disk 48 becomes a factor unless collimation is provided. If a single light source without collimation were employed, spacing between the disk and plate would necessarily have to be decreased in order to prevent cross-talk. However, the spacing requirement becomes negligible with the use of collimated light which prevents the angular cross talk between the fine segments of a particular track and the individual slits of a group.

It will be seen that, in some instances, it will not be necessary to employ slit groups. For example, in encoders using "inside-out" disks of the invention, having a comparatively smaller number of tracks and therefore comparatively larger width LSD segments, averaging is not primarily important and light photoelectors can be provided at sufficiently high levels. Nevertheless, it would be desirable to maintain a constant, or at least a minimum, transition slope for each track. In such instance, plate 84 could be replaced with a limiting means such as plate 104 shown in FIG. 6 as having a simple V-shaped slit 106. Slit 106 is dimensioned at its widest end similarly to the width of slit 88 of plate 84, and at its narrowest and similarly to the width of one of slits 98 of plate 84. Of course, the center line of slit 106 is positioned parallel to radial line 58 in the assembled apparatus.

The invention has heretofore been described in connection with encoders based upon the transmissiveness of segments of a coded disk. However, as is well known in the art, encoders can be made in which the coding function of the disk is accomplished by reflection. For instance, the track segments are formed as alternating radiation reflective and radiation absorbent areas. In such case, the light source is placed so that an elongated area lying along a radius of the disk is illuminated with light directed at an angle to the plane of the disk and the photoelectric detectors are then disposed in the path of the reflected radiation.

Alternatively, the disk can be in a conical form and the coded reflective and absorbent segments disposed on the conical face. This too will provide reflection away from the light source according to the angle of the cone. Consequently it will be seen that as used in the claims hereinafter, the term "radiation-directing" is intended to include both reflective and transmissive qualities, while the term "radiation-absorbing" is intended to cover either radiation opaqueness as distinct from radiation transmissiveness or radiation absorbency as distinct from radiation reflectiveness. It will be appreciated that in transmissive or permeable, or reflecting processes that there is always some attentuation; the terminology used is intended to include such instances.

Likewise, opacity and absorbency are usually relative, there being some small transmission or reflection, as the case may be, in many instances. In any of these processes or conditions however, the small deviation from absolute conformity is considered immaterial.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. Optical encoding apparatus comprising
a radiation source,
means responsive to radiation from said source,
a coded disk rotably mounted for selectively directing said radiation so as to actuate discrete portions of said radiation-responsive means in accordance with the angular position of said disk,
said disk having a plurality of concentric annular tracks thereon,
each track being divided into a respective plurality of alternating radiation-directive and radiation-absorbent segments according to a predetermined digital code,
the track of least radius having its plurality of said segments corresponding to the least significant digits of said code,
each track of successively larger radius having its respective plurality of said segments thereof corresponding to respective successive groups of more significant digits of said code,
the track of greatest radius having its plurality of segments corresponding to the most significant digits of said code, and
means positioned between said disk and said radiation-responsive means, for limiting radiation transmitted from selected radiation-directing segments to respective ones of said discrete portions and coacting with each of said selected segments for providing to each of said respective portions a radiation level of a magnitude for segments of any one track substantially the same as for segments of any other track and for providing a transition slope for segments of any one track substantially the same as for segments of any other track.

2. Optical encoding apparatus as defined in claim 1 including means for collimating radiation from said source and for directing the collimated illumination substantially to a fixed elongated area lying radially along said disk.

3. Optical encoding apparatus as defined in claim 1 wherein said means for limiting radiation comprises a radiation opaque member having at least radiation-comprises a radiation opaque member having at least radiation-permeable portions therein each of which is positioned in the path of radiation from a respective one of said tracks, the width of each of said portions being a function of the radius of the respective track corresponding thereto.

4. Optical encoding apparatus as defined in claim 1 wherein said means for limiting radiation comprises a radiation-opaque member having an open V-shaped slit therein, said slit being so disposed that the narrow end thereof is adjacent the innermost track of said disk and the wider end thereof is adjacent the outermost track of said disk.

5. Optical encoding apparatus as defined in claim 1 wherein said means for limiting radiation comprises a radiation-opaque member having therein a plurality of elongated radiation-permeable slits, said plurality of slits comprising a first sequence of individual slits each being disposed in the path of radiation from a respective one of an adjacent number of said tracks so that the first of said individual slits corresponds to said track of greatest radius and the other of said individual slits each corresponding to respective successive tracks of lesser radius of said number, the width of each of said individual slits being a function of the radius of the respective track corresponding thereto, and a second sequence of groups of slits, each group being disposed in the path of radiation from respective ones of the remainder of said tracks.

6. Optical encoding apparatus as defined in claim 5 wherein all of the sequences of slits have axes of elongation which lie along radially directed lines from a common center.

7. Optical encoding apparatus as defined in claim 5 wherein each of said slits has a respective substantially uniform width and a length not more than the radial dimension of a segment on the respective track corresponding thereto.

8. Optical encoding apparatus as defined in claim 5 wherein each of said groups of slits comprises a plurality of slits spaced from one another an integral multiple of the width of a segment of the track corresponding thereto, the width of all slits in any of said groups being substantially the same and being determined in accordance with the radius of the corresponding track.

9. Optical encoding apparatus as defined in claim 8 wherein the number of slits of any of said groups is selected so that the total area thereof for any of said groups is substantially the same as any other of said groups.

10. For use with an optical encoding apparatus comprising:

a radiation source, means responsive to radiation from said source, a coded disk rotatably mounted for selectively directing said radiation so as to actuate discrete portions of said radiation-responsive means in accordance with the angular position of said disk, said disk having a plurality of concentric annular tracks thereon, each track being divided into a respective plurality of alternating radiation-directive and radiation-absorbent segments according to a pre-determined digital code.

the track of least radius having its plurality of said segments corresponding to the least significant digits of said code, each track of successively larger radius having its respective plurality of said segments thereof corresponding to respective successive groups of more significant digits of said code, the track of greatest radius having its plurality of segments corresponding to the most significant digits of said code, an improvement, comprising a device adapted for positioning between said disk and said radiation-responsive means, said device including means for limiting radiation transmitted from selected radiation-directing segments to respective ones of discrete portions, and means co-acting with each of said selected segments for providing to each of said respective portions a radiation level of a magnitude for segments of any one track substantially the same as for segments of any other track and for providing a transition slope for segments of any one track that is substantially the same as for segments of any other track.

11. A device as defined in claim 10 wherein said means for limiting radiation comprises a radiation opaque member, and said means coacting with each of said selected segments comprises an arcuate section in said member with sides parallel to radii of said disk.

References Cited by the Examiner

UNITED STATES PATENTS

| | | | |
|---|---|---|---|
| 1,863,363 | 6/32 | Zworykin | 250—233 X |
| 2,659,828 | 11/53 | Elliott | 250—233 X |
| 2,783,389 | 2/57 | Cummings et al. | 250—233 X |
| 2,796,534 | 6/57 | Williams | 250—233 X |
| 2,945,167 | 7/60 | Gunther | 250—233 X |
| 3,058,001 | 10/62 | Dertouzos | 250—233 X |
| 3,058,005 | 10/62 | Hurvitz | 250—233 X |
| 3,064,136 | 11/62 | Mann | 250—233 X |
| 3,106,642 | 10/63 | Shapiro | 250—233 X |

FOREIGN PATENTS

| | | |
|---|---|---|
| 846,771 | 8/60 | Great Britain |
| 56,772 | 7/52 | France. |

RALPH G. NILSON, *Primary Examiner.*

ARCHIE R. BORCHELT, *Examiner.*